United States Patent [19]

Stevenson

[11] Patent Number: 5,248,323
[45] Date of Patent: Sep. 28, 1993

[54] VACUUM CLEANER AND FILTER THEREOF

[75] Inventor: Philip H. Stevenson, Cleveland, Ohio

[73] Assignee: Health-Mor, Inc., Cleveland, Ohio

[21] Appl. No.: 973,777

[22] Filed: Nov. 9, 1992

[51] Int. Cl.⁵ .................................................. B01D 53/04
[52] U.S. Cl. ................................... 95/90; 55/337; 55/498; 55/500; 55/528; 55/DIG. 3; 95/268; 96/142; 96/153
[58] Field of Search ............ 55/74, 97, 316, 337, 55/379, 387, 472, 498, 500, 524, 528, DIG. 3

[56] References Cited

U.S. PATENT DOCUMENTS

| | | | |
|---|---|---|---|
| 2,627,936 | 2/1953 | Martinet | 183/37 |
| 2,627,937 | 2/1953 | Martinet | 183/37 |
| 3,343,344 | 9/1967 | Fairaizl et al. | 55/376 |
| 3,870,495 | 3/1975 | Dixson et al. | 55/524 X |
| 4,365,980 | 12/1982 | Culbert et al. | 55/498 X |
| 4,504,290 | 3/1985 | Pontius | 55/316 |
| 4,650,505 | 3/1987 | Magdelain | 55/316 |
| 4,702,753 | 10/1987 | Kowalczyk | 55/316 X |
| 4,909,815 | 3/1990 | Meyer | 55/316 |

Primary Examiner—Charles Hart
Attorney, Agent, or Firm—Body, Vickers & Daniels

[57] ABSTRACT

In a vacuum cleaner comprising a reduced velocity chamber with a high velocity air inlet, an electric motor, a rotary means driven by the motor for creating a vacuum in the chamber, an outlet for exhausting air from the chamber, which air flows in a selected path from the air inlet, through the chamber and out the air exhaust outlet and a disposable porous sheet filter layer in the chamber for removing solids particles from the air there is provided an improvement comprising a gas removing filter between the filter layer and the motor where the gas removing filter comprises an activated charcoal filter layer in the chamber, intersecting the air path and generally coterminous with the disposable filter layer.

35 Claims, 4 Drawing Sheets

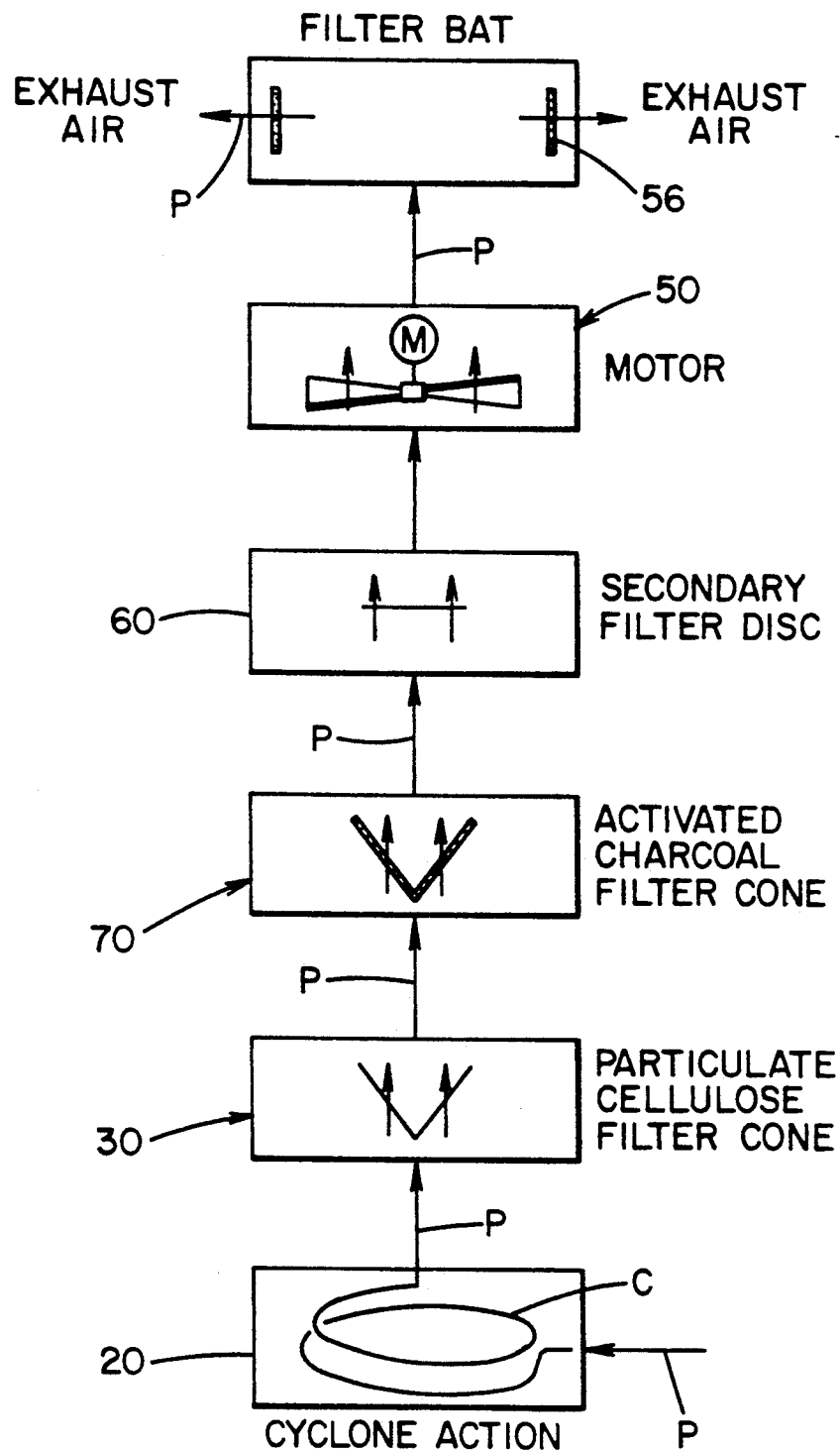

VACUUM CLEANER AND FILTER THEREOF

The present invention relates to the art of vacuum cleaners and more particularly to an improved vacuum cleaner employing a novel filter element.

The invention is particularly applicable for a canister type vacuum cleaner and it will be described with particular reference thereto; however, the invention has much broader applications and may be used to provide an improved vacuum cleaner by employing the novel filter element and filtering method as contemplated by the present invention.

INCORPORATION BY REFERENCE

Martinec U.S. Pat. Nos. 2,627,936 and 2,627,937, issued in 1953, are incorporated herein as background information regarding the type of vacuum cleaner to which the present invention is particularly applicable. In addition, U.S. Pat. No. 3,343,344 is incorporated by reference herein to illustrate a canister type vacuum cleaner with a low velocity receptacle or chamber into which is placed a conical filter sheet formed from nonwoven cellulose fiber and over a downwardly extending support structure for the purpose of removing particulate material from the air being processed through the vacuum cleaner. The rigid perforated conical support structure or member holds the filter sheet in its conical configuration. The support member and filter sheet or filter element are mounted together with the layer covering the rigid support member. Within the conical support member there is provided a generally flat disc shaped cellulose filter sheet for further removal of particulate solids as the solids pass with the air from the canister through the conical filter sheet and through the disc to the outlet or exhaust of the vacuum cleaner. This third patent is incorporated by reference herein to preclude the necessity of repeating structural details not generally related to the inventive aspect of the present invention.

BACKGROUND OF INVENTION

A canister type vacuum cleaner is illustrated in the patents incorporated by reference herein and includes a reduced velocity chamber with a high velocity air inlet. Air is drawn into the chamber by an electric motor which drives a rotary means, or fan, for creating vacuum in the chamber to draw air laden with particulate material through the chamber and force it from the outlet as exhausted clean air. Canister type vacuum cleaners normally include a conical filter extending downwardly into the canister or low velocity chamber and formed of a porous mat to remove the dirt and debris carried by the air coming into the canister. The high velocity air drawn into the chamber has a tendency to entrain large solid particles which are brought into the low velocity chamber where the air is then swirled or vortexed in a centrifuge configuration with convolutions so that large particles carried into the chamber with the inlet air are extracted by the vortexed or cyclonic action of the air in the canister. Thereafter, the air is pulled upwardly through the conical filter mat or porous layer toward an upper motor that drives a fan for creating a vacuum in the canister, or reduced velocity chamber, so that the air flowing upwardly through the conical filter passes through a filter disc and outwardly through an exhaust passage, or passages, above the canister.

The canister type vacuum cleaner, as so far described, cannot efficiently remove gaseous impurities, such as paint fumes and other odor creating gases which are entrained in the air and pass through the vacuum cleaner. Such gaseous materials, or fumes, are sometimes flammable and can be ignited by the sparks of the motor driving the vacuum cleaner. This is a problem associated with all vacuum cleaners in general. For that reason, vacuum cleaners are used for removing debris from carpets, draperies and other surfaces, but are not generally employed for the purpose of removing fumes and gaseous impurities from ambient air. It has been suggested that a filter could be employed in the exhaust area as a separate canister to remove gaseous contaminants of the air exhausting from the vacuum cleaner. This concept, which has not been widely employed, still allows the fumes to be in contact with the sparks of the electric motor driving the vacuum cleaner. In addition, the use of activated charcoal for removing gas has not been attempted internally of vacuum cleaners and particularly not in canister type vacuum cleaners because the particles of carbon which form the activated charcoal type of filtering elements are extremely flammable and were heretofore believed to be inappropriate for use in the low velocity chamber of a vacuum cleaner.

This chamber is in the path of air flowing through the vacuum cleaner upstream or prior to the vacuum cleaner driving electric motor; consequently, carbon particles introduced by the filter element would provide an apparent problem at the motor area.

In summary, vacuum cleaners, in general, and canister type vacuum cleaners, in specific, have not heretofore been adapted for uses which would encounter explosive and/or noxious gases or fumes entrained in the air passing through the vacuum cleaner.

THE INVENTION

The present invention relates to an improved vacuum cleaner with a novel filtering arrangement which allows a vacuum cleaner, and more particularly a canister type vacuum cleaner, to be modified for the purpose of handling a wide variety of gaseous contaminants entrained in the air being drawn through the vacuum cleaner by an electric motor. Thus, the vacuum cleaner can be an environmental air cleaning device as well as a standard vacuum cleaner.

In accordance with the present invention, there is provided an improvement in a vacuum cleaner of the type comprising a reduced velocity chamber with a high velocity air inlet, an electric motor, a rotary means driven by the motor for creating a vacuum in the chamber, an outlet for exhausting air from the chamber, which air flows in a selected path from the air inlet, to the low velocity chamber, and out the air exhaust outlet or outlets and a disposable porous sheet filter layer in the chamber for removing solid particles from the air, which filter layer intersects the air path. The improvement in this type of vacuum cleaner is the provision of a changeable gas removing filter between the filter layer and the motor of a vacuum cleaner, which gas removing filter comprises an activated charcoal filter layer or element in the chamber and generally coterminous with the disposable filter layer. In this manner, the standard filter removes solid, while the filter element between standard filter element and the motor removes gas such as smoke, fumes, gas contaminants and noxious gaseous substances laden in and carried by the air passing through the vacuum cleaner. By providing a separate filter element between the charcoal filter element and the motor, any carbon particles which flake from the filter element do not form a fire hazard or explosive mixture at the electric motor of the vacuum cleaner.

In accordance with the primary aspect of the present invention, both the disposable filter layer or element and the charcoal filter layer or element are conical in shape and are provided with means in the vacuum cleaner itself for supporting the two filter elements in a nested conical relationship. Consequently, the thin mat forming the conical charcoal filter element is sandwiched between the standard conical cellulose filter element and the rigid conical support structure of a standard canister type vacuum cleaner. This construction allows the use of a conical activated charcoal filter layer or element to be easily adapted for use in a standard canister type vacuum cleaner without modification of the vacuum cleaner. The use of the charcoal filter element between the standard cellulose type filter elements and the filter disc captures any gaseous substances in the air within the charcoal filter element and prevents carbon from progressing with the air from the canister to the electric motor.

In accordance with a primary aspect of the present invention, a gas removing filter formed into a conical layer of non-woven activated charcoal matting is novel. In accordance with an aspect of the invention, there is provided such a conical gas removing filter element for use in combination with the conical solid removing filter element of a canister type vacuum cleaner wherein the conical gas removing filter comprises a layer of activated charcoal material in the form of a non-woven mat impregnated with activated carbon. In accordance with this aspect of the invention, the mat has a thickness of less than about ½ inch and is preferably a conical mat structure wherein the layer of activated charcoal filtering material is approximately ¼ inch in thickness. Preferably, the mat is a non-woven polyester material impregnated with activated carbon. The non-woven cellulose filer has a substantially lesser thickness because it acts upon particles. The novel filter has a normally sponge texture to create more surface area for the active carbon. Preferably the activated charcoal is ¼ inch matting sold by Lewcott Corporation as Part No. ACF-NWPE-4.0-150.

The primary object of the present invention is the provision of a novel filter element that can be easily used in a canister type vacuum cleaner, which filter element is formed from a thin layer of non-woven mat impregnated with activated carbon and is preferably formed into the shape of a conical filter element when used in a standard canister type vacuum cleaner.

Another object of the present invention is the provision of a filter element as described above, which filter element can be changed easily and can be used in a standard canister type vacuum cleaner without modification of existing vacuum cleaner structure.

Yet another object of the present invention is the provision of a filter element, as defined above, which filter element has a large area to which the air flowing from the canister toward the exhaust outlet of the vacuum cleaner has a relatively large area compared to a standard circular disc shaped filter element.

Yet another object of the present invention is the provision of a conical charcoal filter element adapted to be sandwiched within and held in nested position with a standard conical filter element of a canister type vacuum cleaner. The novel element is located in the area of the vacuum cleaner which is protected by a filter preventing carbon particles from flaking from the activated charcoal filter element and progressing, with the air, into the area of the vacuum cleaner experiencing sparks from the electric driving motor.

Still a further object of the present invention is the provision of a conical filter element, of the type defined above, which filter element is fixedly located in the reduced air velocity chamber or area of a vacuum cleaner so that low velocity air passes through the novel filter element to allow resident time to contact the large surface area of the loose mat to remove fumes, gases and other noxious substances from the air being cleaned by the vacuum cleaner.

Still a further object of the present invention is the provision of a filter element, as defined above, which filter element allows the standard canister type vacuum cleaner to be used as an air cleaner to remove smoke, paint fumes, and other deleterious gaseous substances from ambient air within a closed room or area.

Another object of the present invention is the provision of a filter element, as defined above, which filter element can be removed and changed if desired when changing the standard conical filter element of a canister type vacuum cleaner.

Yet a further object of the present invention is the provision of an improved vacuum cleaner which employs the novel filter element defined above. More particularly, the object is to provide an improved canister type vacuum cleaner and filtering method wherein the standard and novel filter elements are in the form of nested conical structures.

A basic object of the present invention is the provision of a novel filter element and filtering method for allowing a standard canister type vacuum cleaner to be used for cleaning ambient air, such as removing cigarette smoke or paint fumes.

These and other objects and advantages will become apparent from the following description taken together with the accompanying drawings.

PREFERRED EMBODIMENT

Figure 1:
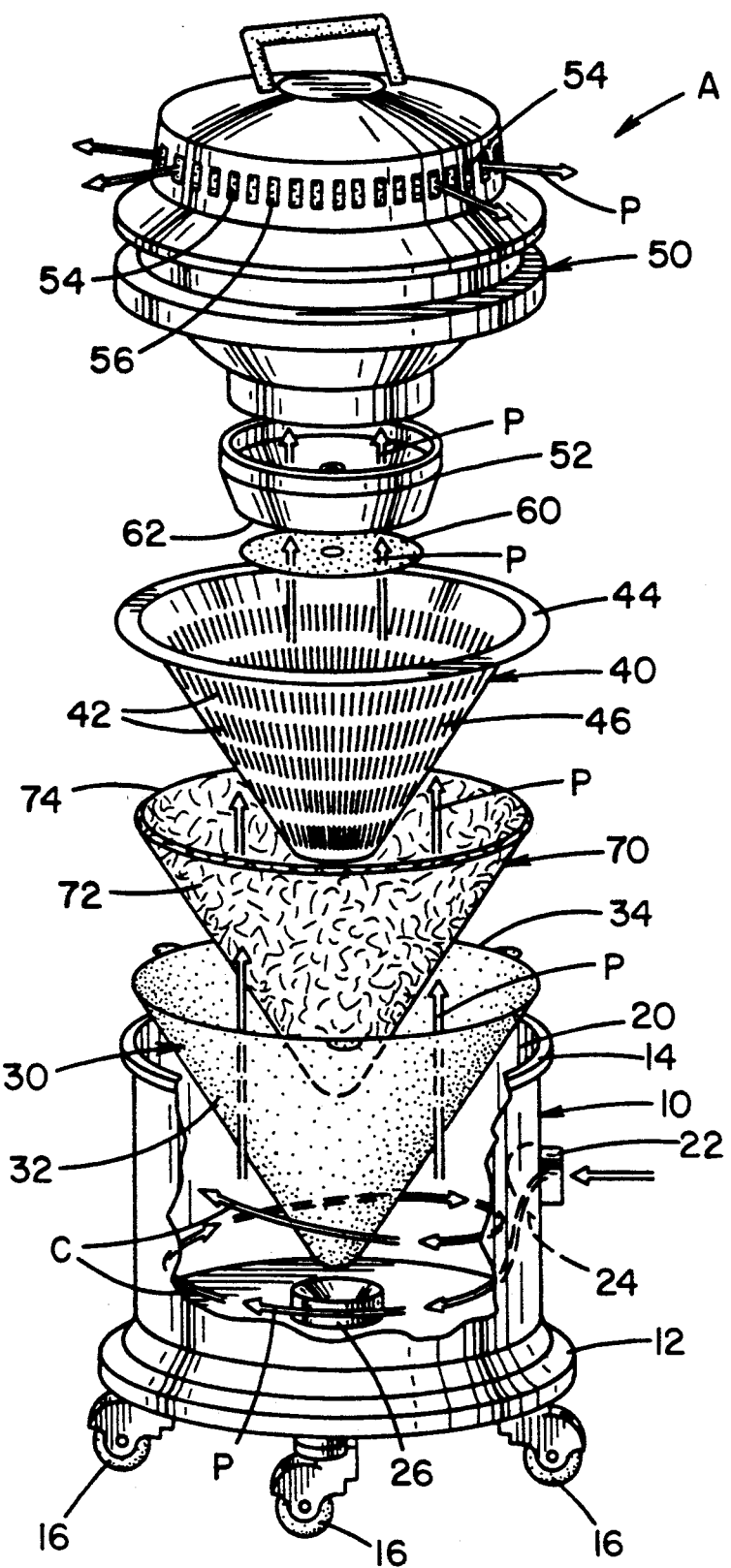
FIG. 1 is a pictorial exploded view of a standard canister type vacuum cleaner employing the novel filter element of the present invention.
Figure 4:
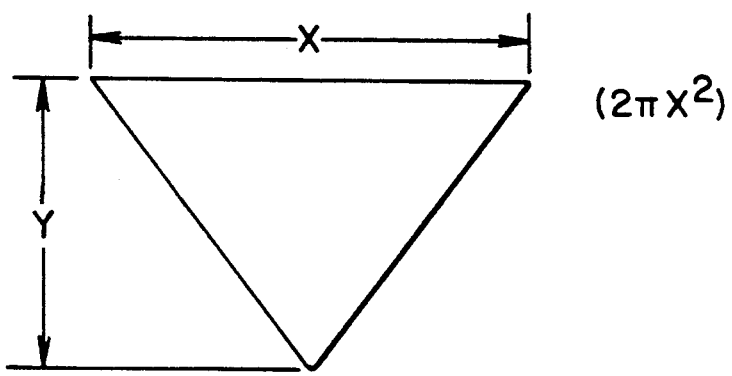
FIG. 4 is a side elevational view showing the geometric configuration of the preferred embodiment of the present invention illustrated in FIGS. 2 and 3.

Referring now to the drawings wherein the showings are for the purpose of illustrating a preferred embodiment of the invention only and not for the purpose of limiting same, FIG. 1 shows a canister type vacuum cleaner A having a lower generally cylindrical canister 10 with a base 12 and an upper circular opening defined by rim 14. In the illustrated embodiment, a plurality of circumferentially spaced wheels 16 support canister 10 for movement along the floor of a room being cleaned. Canister 10 includes a low velocity chamber 20 with a high velocity inlet 22, an air deflector 24 and a lower filter rest 26. Air flow through the vacuum cleaner is illustrated as arrows defining a path P. In chamber 20 of canister 10, path P is in the form of a vortexed or cyclone portion C of several convolutions so that particles carried by air through chamber 20 are removed by centrifugal force and are retained in the low velocity chamber 20. Thereafter, air flow path P is generally in an upwardly vertical direction so that the air being cleaned moves through a conical filter element, or layer, 30 formed from a flat, non-woven cellulose fiber with an outer conical surface 32 and an upper circular opening 34. The diameter of open end 34 is X and the height of a conical filter 30 is Y, as shown in FIG. 4. In this manner, a substantially increased amount of filtering surface is obtained through use of a conical surface. Otherwise, filtering would be through a circular area defined by the diameter of open end 34. Filter layer 30 is relatively thin since it includes small interstices to physically block the passage of solid particles. To retain the conical shape of the relatively unstable conical element 30, there is provided a filter support 40 having a large number of perforations 42 and an upper circular rim 44. When assembled, conical support 40 nests within thin, conical filter layer 30 and rim 44 clamps the filter layer against rim 14 of canister 10. The outer conical surface 46 bears against the inner conical surface of filter layer or element 30 in normal practice to support this conical filter element. As so far described, air passes through the thin, non-woven conical cellulose layer or filter element 30 through perforations 42 and upwardly in a direction defined by air path P.

Figure 2:
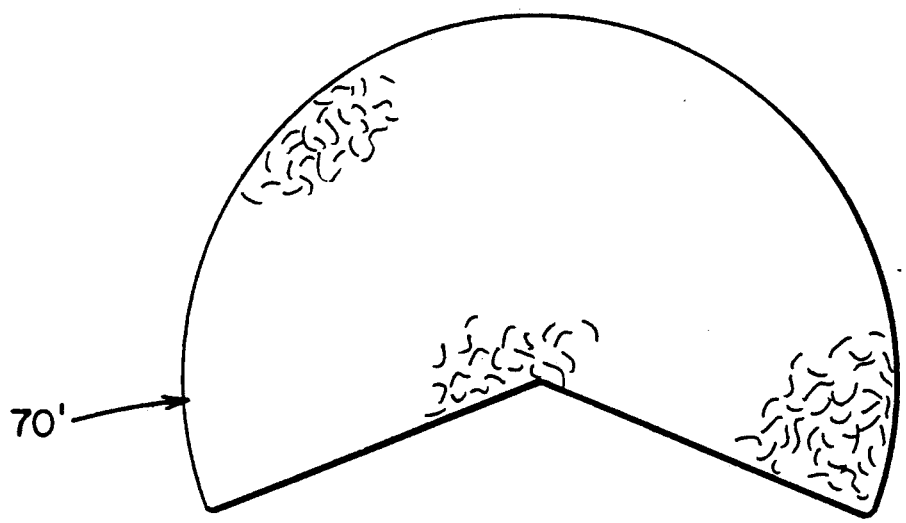
FIG. 2 is a top view of a flat blank of spongy activated mat cut into a shape for subsequent forming into the preferred embodiment of the present invention.
Figure 5:
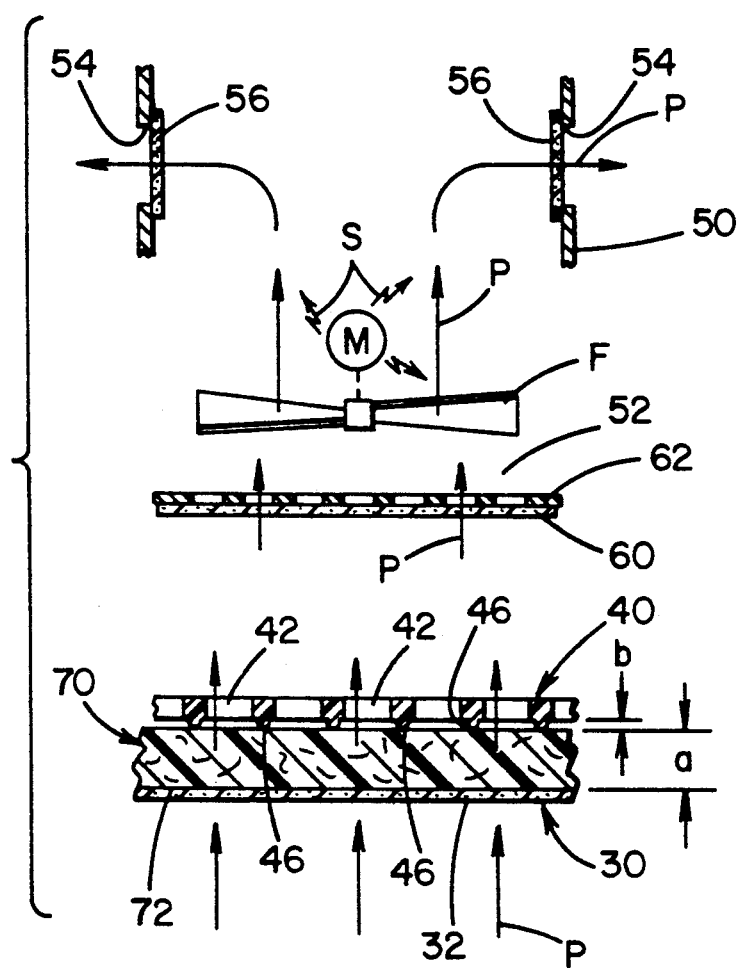
FIG. 5 is a schematic layout view of the air flow through a vacuum cleaner provided with the present invention; and, FIG. 6 is a block diagram showing the filtering and operating steps of a canister type vacuum cleaner improved by incorporating the novel filtering element of the present invention.

In accordance with standard practice, a motor driven fan housing 50, of the type shown in the prior art, includes a lower inlet 52 and an air exhaust shown as a large number of peripherally spaced outlet exhaust openings 54 having a common cylindrical secondary filter 56 for removal of any solid particles reaching housing 50. Secondary filter disc 60 is before motor 50 and is supported by a flat perforated support disc 62, as best shown in FIG. 5. As so far described, canister vacuum cleaner A is constructed in accordance with standard practice. In accordance with the invention, there is provided a novel, conical filter element 70 formed from a blank of spongy, flat non-woven polyester mat material impregnated with activated charcoal, shown as blank 70' in FIG. 2. This blank is formed into the conical shape shown in FIGS. 1 and 3 to produce a cone that will nest within conical filter element or layer 30 and is sandwiched between this thin filter layer and filter support 40, as shown in FIG. 5. The novel conical filter element 70 includes an outer conical surface 72 and an upper generally circular opening 74 and is rigidified by being held between filter 30 and support 40. In accordance with the preferred embodiment of the invention, perforations 42 are defined by a plurality of inwardly facing ribs 46 as schematically illustrated in FIG. 5. These ribs substantially reduce the surface contact between support 40 and the inner surface of filter element 70 to allow more filter surface on element 70. This has shown to provide an increase of 15% in the air flow through the vacuum cleaner when supplied with the novel activated charcoal conical filter element 70, as so far described.

Figure 3:
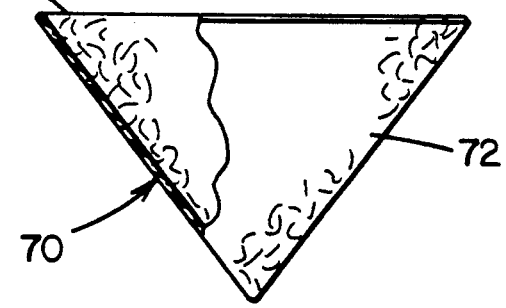
FIG. 3 is a side view of the mat shown in FIG. 2 formed into a conical element and showing the cross-section of the filter element partially.

In FIG. 5, it is shown that the thin filter element 30 and spongy relatively thick filter layer 70 are sandwiched together so that air flowing through this composite filtering structure is first intercepted by conical element 30. This element removes the solid particles which have not been centrifuged out in canister 10. The air passing through thick conical filter 70 engages the crevices of the activated surfaces of the activated carbon particles impregnated within the mat forming filter element 70. This mat has a thickness a which in practice is approximately ¼ inch. The thickness of element 70 should be greater than three times the thickness of element 30. As shown in FIGS. 3 and 5, element 70 includes a thick mat of polyester fibers to hold a large volume of small carbon particles. Spacing b is the standoff position caused by ribs 46. This standoff is approximately ⅛ inch.

As the air moves through conical filter 70, fumes and other entrained gases are attracted by the activated carbon and do not pass upwardly through disc 60. Thus, improved vacuum cleaner A can be used for cleaning smoke, from an enclosed room. It is appreciated that the vacuum cleaner can clean the ambient air for a normal household use. In addition, it is possible to remove certain gaseous substances such as paint fumes before the fumes reach the sparks caused by motor M in the motor driven fan housing 50. Fan F draws air through disc 60. This disc prevents carbon flaking from element 70 from coming into contact with the sparks S of motor M, as the air is pulled by vacuum along the path P through exhaust 54 of fan housing 50. By employing the novel filter elements before disc 60, the gas can be removed without causing carbon contamination adjacent motor M. The present invention is a substantial improvement over any concept of placing activated charcoal adjacent the peripheral outlet exhaust 4.

As shown in FIG. 6, the air passes upwardly from the cyclone action of canister 20 through exhaust 56 by passing the novel filter 70 positioned between conical filter cone 30 and flat filter disc, or secondary filter 60. FIG. 6 illustrates a novel method of processing air in a vacuum cleaner, which novel method has not been heretofore available, especially in canister type vacuum cleaners. This novel method allows the vacuum cleaner to be capable of removing deleterious gaseous substances entrained within the air being cleaned.

Having thus defined the invention, the following is claimed:

1. In a vacuum cleaner comprising a reduced velocity chamber with a high velocity air inlet, an electric motor, a rotary means driven by said motor for creating a vacuum in said chamber, an outlet for exhausting air from said chamber, which air flows in a selected path from said air inlet, through said chamber and out said air exhaust outlet and a disposable porous sheet filter layer in said chamber for removing solid particles from said air, said chamber retaining particle settling out from said air, said filter layer intersecting said air path, the improvement comprising: a gas removing filter between said filter layer and said motor said disposable filter layer and said carbon filter layer both being generally conical in shape, said gas removing filter comprising an activated charcoal filter layer in said chamber, intersecting said air path and generally coterminous with said disposable filter layer, and means for supporting said filter layers in a nested relationship and maintaining said filter layers generally conical shape.

2. The improvement as defined in claim 1 including a second filter layer for removing solid particles, said second filter layer being a porous sheet intersecting said air path between said charcoal filter layer and said motor.

3. The improvement as defined in claim 2 wherein said chamber includes centrifugal filter means for causing said air path to flow in circular convolutions from said air inlet to said porous filter layer.

4. The improvement as defined in claim 1 wherein said chamber includes centrifugal filter means for causing said air path to flow in circular convolutions from said air inlet to said porous filter layer.

5. The improvement as defined in claim 4 including means for releasably supporting said disposable filter layer and said charcoal filter layer into a composite dual filter cone.

6. The improvement as defined in claim 2 including means for releasably supporting said disposable filter layer and said charcoal filter layer into a composite dual filter cone.

7. The improvement as defined in claim 1 including means for releasably supporting said disposable filter layer and said charcoal filter layer into a composite dual filter cone.

8. The improvement as defined in claim 7 wherein said charcoal filter layer is a non-woven mat impregnated with activated carbon.

9. The improvement as defined in claim 8, wherein said filter layer has a thickness less than about ½ inch.

10. The improvement as defined in claim 9 wherein said filter layer has a thickness of about ¼ inch.

11. The improvement as defined in claim 8, wherein said mat is non-woven polyester.

12. The improvement as defined in claim 4 wherein said charcoal filter layer is a non-woven mat impregnated with activated carbon.

13. The improvement as defined in claim 2 wherein said charcoal filter layer is a non-woven mat impregnated with activated carbon.

14. The improvement as defined in claim 1 wherein said charcoal filter layer is a non-woven mat impregnated with activated carbon.

15. The improvement as defined in claim 7 wherein said support means includes a rigid cone formed of perforated material.

16. The improvement as defined in claim 15 wherein said perforated material has spaced inwardly facing rib means for pressing said charcoal filter layer against said disposable filter layer.

17. The improvement as defined in claim 14 wherein said perforated material has spaced inwardly facing rib means for pressing said charcoal filter layer against said disposable filter layer.

18. A gas filter for use in a vacuum cleaner having a reduced-velocity chamber with a high-velocity air inlet, an electric motor, a rotary means driven by said motor for creating a vacuum in said chamber, an outlet for exhausting air from said chamber, which air flows in a selected path from said air inlet, through said chamber and out said air exhaust outlet and a disposable porous sheet filter layer in said chamber for removing solid particles from said air, said chamber includes centrifugal means for causing said air path to flow in circular convolutions and retain particles settling out from said air, said porous sheet filter intersecting said air path, said gas filter having a conical shape and adapted to be positioned between said chamber air inlet and said electric motor and comprising an activated charcoal layer in the form of a mat impregnated with activated carbon, said impregnated mat having a thickness of less than about ½ inch.

19. The gas filter as defined in claim 18, wherein said gas filter is generally coterminous with said porous sheet filter.

20. The gas filter as defined in claim 18, wherein said mat is a non-woven polyester material.

21. The gas filter as defined in claim 20, wherein said mat is a non-woven polyester material.

22. The gas filter as defined in claim 18, wherein said polyester material is a high-surface area, spongy material.

23. The gas filter as defined in claim 21, wherein said polyester material is a high-surface area, spongy material.

24. The gas filter as defined in claim 18, wherein said gas filter is disposable.

25. The gas filter as defined in claim 23, wherein said gas filter is disposable.

26. The gas filter as defined in claim 18, wherein a secondary particle filter is positioned between said gas filter and said electric motor.

27. The gas filter as defined in claim 25, wherein a secondary particle filter is positioned between said gas filter and said electric motor.

28. The gas filter as defined in claim 18, wherein said gas filter is positioned between two particle filter layers.

29. The gas filter as defined in claim 27, wherein said gas filter is positioned between two particle filter layers.

30. The gas filter as defined in claim 18, wherein said gas filter is in a nested relationship with a support means, said support means maintaining said gas filter in a generally conical shape.

31. The gas filter as defined in claim 27, wherein said gas filter is in a nested relationship with a support means, said support means maintaining said gas filter in a generally conical shape.

32. The gas filter as defined in claim 30, wherein said support means includes a rigid cone having spaced, inwardly-facing rib means for maintaining said gas filter in a conical shape.

33. The gas filter as defined in claim 31, wherein said support means includes a rigid cone having spaced, inwardly-facing rib means for maintaining said gas filter in a conical shape.

34. A method of cleaning air by use of a canister type vacuum cleaning including the steps of:
(a) drawing air through a high velocity air inlet into a low velocity chamber;
(b) centrifuging the air in the low velocity chamber to remove solid particles;
(c) passing said air through a conical composite filter including a first solid particle removing filter layer and a second filter layer of activated charcoal for removing gases from said air;
(d) then passing said air through a filter layer for removing solids, such as carbon particles; and,
(e) forcing said air past said motor and out an air outlet.

35. A method of cleaning air as defined in claim 34 wherein said means for supporting includes a filter support nested in said carbon filter to maintain said conical shape of said filter as said air passes through said filter.

* * * * *